United States Patent [19]
Dörr

[11] 3,940,581
[45] Feb. 24, 1976

[54] SWITCH CONSTRUCTION, PARTICULARLY FOR INDICATING AUTOMOBILE SEAT LOADING

[75] Inventor: Helmut Dörr, Sachesenheim, Germany

[73] Assignee: SWF-Spezialfabrik fur Autozubehor Gustav Rau GmbH, Germany

[22] Filed: Aug. 29, 1974

[21] Appl. No.: 501,840

[30] Foreign Application Priority Data
Sept. 15, 1973 Germany............................ 2346578

[52] U.S. Cl.............. 200/85 A; 340/277; 200/153 M
[51] Int. Cl.²............................................ H01H 3/14
[58] Field of Search.......... 200/85 A, 153 M, 61.18, 200/61.19; 340/277

[56] References Cited
UNITED STATES PATENTS

| | | | |
|---|---|---|---|
| 1,422,318 | 7/1922 | Stevens............................ | 200/85 A |
| 1,668,929 | 5/1928 | Westervelt......................... | 200/85 A |
| 3,761,659 | 9/1973 | Eberle et al. ..................... | 200/85 A |

Primary Examiner—David Smith, Jr.
Attorney, Agent, or Firm—McGlew and Tuttle

[57] ABSTRACT

A switch, particularly one for indicating whether an automobile seat is occupied or unoccupied, comprises a switch housing with a spring contact secured at a base portion to respective side walls of the housing and extending inwardly from the respective side walls into biased contacting engagement. An actuating rod is guided for axial sliding movement through the housing and it includes a switching member having an upstanding portion of insulating material which extends between the spring contacts in a non-actuated position. The actuating rod is provided with a connection at its one end to a spring suspension of the seat so that the whole rod is shifted together with the switching member during the loading of a seat to move the insulating material away from its position between the spring contacts to permit the contacts to come together into conducting relationship.

3 Claims, 3 Drawing Figures

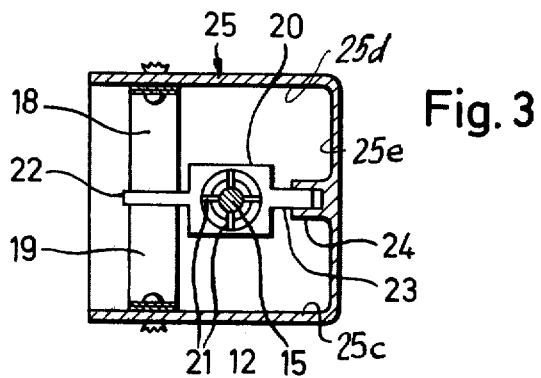
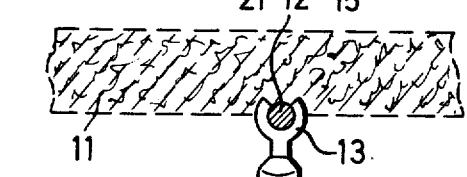
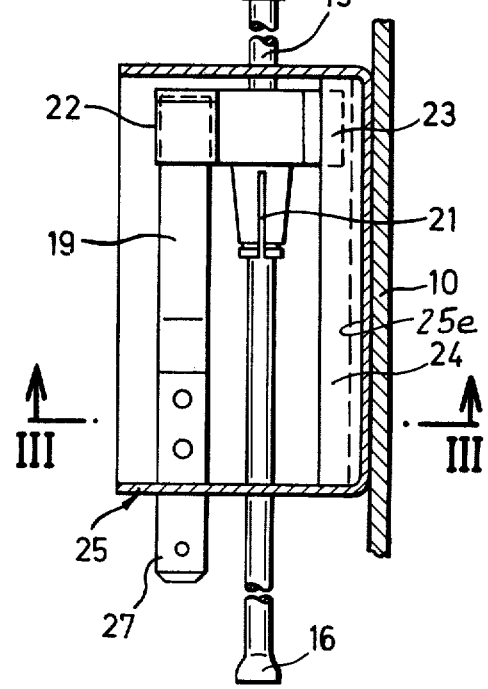
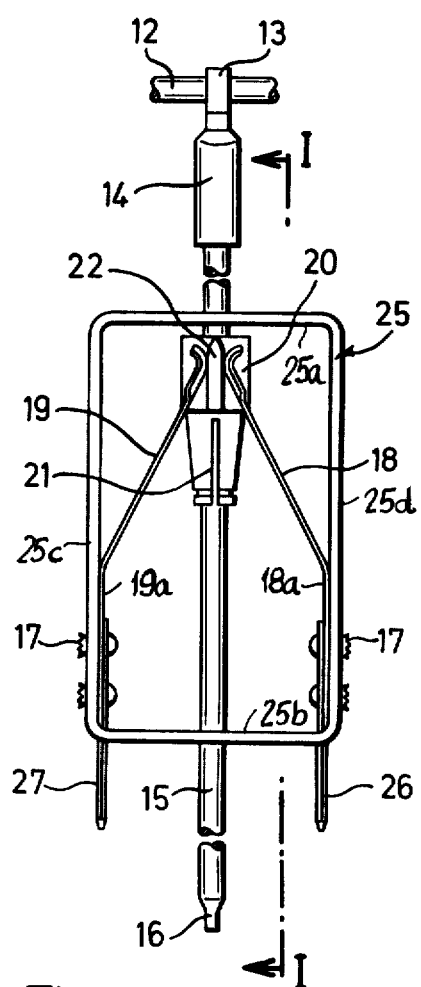

SWITCH CONSTRUCTION, PARTICULARLY FOR INDICATING AUTOMOBILE SEAT LOADING

FIELD AND BACKGROUND OF THE INVENTION

This invention relates in general to the construction of electrical switches and, in particular, to a new and useful switch for sensing the loading and unloading a a vehicle seat, which includes a movable rod member carrying a switching member which is disposed between spring contacts which are biased toward engagement and which will move out of position to separate the spring contacts in order to permit them to move together.

DESCRIPTION OF THE PRIOR ART

The present invention is particularly concerned with a switch of a type which is employed for indicating whether an automobile vehicle seat is loaded or unloaded. For such a purpose, the electrical switch for actuating an alarm circuit or a seat belt setting circuit is connected to the seat suspension so that an actuating part of the switch is moved during the occupation of a seat to provide an indication of the loading thereof.

A principal difficulty in the construction of switches for indicating the loading of seats is that their operation depends on the amount of seat deflection and they must be free to move between certain wide limits in accordance with the different weights of the passengers who use the vehicle. This means that special attention must be paid to insure that the electrical switch is not damaged during deflections beyond a certain predetermined range. The conventional devices for such purposes include coupling members between the seat suspension and the switching member which are designed so that they can absorb the various deflections of the seat suspension and thus prevent damage to the switch. For this purpose, complicated coupling members which are not very reliable in operation are usually necessary.

SUMMARY OF THE INVENTION

In accordance with the present invention, there is provided a switch for indicating vehicle seat loads, which includes an actuating rod which is connectible to the seat suspension and which carries a switching member which may move between wide ranges through a path and intercepts the contact between two spring contact elements in a non-operative position and permits their contacting engagement in an operative position. The switch is of simple construction and permits a large range of operative movement of the actuating rod and the switching member without any possibility of damage to the switch. The actuating rod which carries the switching member is advantageously provided with a connection at its one end which facilitates its easy fastening to the seat suspension. The opposite end may, for example, be left free so that it can travel for a considerable distance in its guidance within a switch housing. It is disengaged from the spring contacts by moving it beyond the contact range of the two spring elements so that the spring elements come together under their own biasing forces. The actuating rod can directly follow the deflection of the seat suspension and the switching member of the electric switch only makes small movement in order to effect actuation of the contacts but may move a much larger amount if the deflection of the seat requires. The initial setting of the switching member may be easily effected during engagement of the actuating rod to the seat suspension and the securing of the switch housing in a position in which the spring contacts are first aligned with the switching member so that they do not interengage. Any errors which are made in the securement of the housing or the actuating rod in position on the seat are automatically compensated due to the constructional arrangement of the invention because the movement of the switching member may be very great without changing the immediate actuation of the switching circuit. The only alignment that need be made is the alignment of the switching member between the two spring contacts in the initial or off position of the switch and any substantial movement of the suspension of the seat thereafter will cause an actuation of the switch. The switching member itself may move between defined limits of the switch housing and the securement of the switch member in the off position is effected by frictional engagement which may be easily overcome. The switch member itself may be frictionally engaged on its associated actuating rod so that it can be moved in the event of any changes in the connection position or seat suspension location. With a frictional engagement of the actuating member on the actuating rod, an automatic adjustment is effected when there is any possiblity of over-ride of the rod in the guidance of the housing. The construction is such that the necessary switching movement is retained and the associated control position may be easily set in the rest condition.

In the preferred form of the invention, the switching member has a sleeve-shaped extension provided with slots which extend radially outwardly from a central bore through which the actuating rod extends. The actuating rod is supported in bores in each of the housing end walls which provide for easy sliding movement thereof. The switching member which is frictionally engaged over the rod is displaceable between the two end walls of the switch housing.

In the preferred arrangement, the switching member comprises a member having a bore therethrough and a projection which is guidable in a recess on the switching rod so that it may be displaced axially but not rotated. The actuating rod itself may advantageously have an end which is flattened and widened transversely so that it cannot be displaced out of the bores of the housing. The opposite end of the rod advantageously carries a widened sleeve of a material, such a plastic, which has an engaging eyelet which may be snap-fastened to a spring wire of the spring suspension of the seat.

Accordingly, it is an object of the invention to provide an improved switch, particularly for indicating the loading and unloading of an automobile vehicle seat which includes an actuating rod member which is movable in a housing centrally in respect to springs mounted on respective side walls of the housing and extending into biased contacting engagement therebetween and further including a switching member which is advantageously frictionally engaged on the rod and which carries an upstanding portion of insulating material which may be positioned to separate the spring contacts so that they do not make contact and which may be moved with the rod during loading of the seat to move out of the separating position to permit the spring contacts to interengage.

A further object of the invention is to provide a seat particularly for actuating a circuit or signal for indicating or responding to the loading and unloading of a vehicle seat which is simple in design, rugged in construction and economical to manufacture.

For understanding of the principles of the invention, reference is made to the following description of a typical embodiment thereof as illustrated in the accompanying drawing.

BRIEF DESCRIPTION OF THE DRAWING

In the Drawing:

FIG. 1 is a longitudinal sectional view of a switch for indicating the loading of an automobile vehicle seat constructed in accordance with the invention and taken on the line I—I of FIG. 2;

FIG. 2 is a front elevational view of the switch shown in FIG. 1; and

FIG. 3 is a section taken on the line III—III of FIG. 1.

DESCRIPTION OF THE PREFERRED EMBODIMENT

Referring to the drawing in particular, the invention embodied therein, comprises a switch for indicating the loading and unloading of an automobile vehicle seat, which includes a rectangular switch housing, generally designated 25, having end walls 25a and 25b and side walls 25c and 25d and a bottom wall 25e which is secured on a wall 10 of a vehicle or a seat suspension which includes a seat 11 having a spring wire 12 at its underside.

In accordance with the invention, the switch includes first and second resilient contacts or spring contacts 18 and 19 which have base portions 18a and 19a which are secured to side walls 25b and 25c, respectively, by rivets 17. The base portions extend outwardly through end wall 25d and terminate in terminals 26 and 27, respectively. The springs 18 and 19 are held so that the natural biasing force thereof tends to bring them into touching engagement centrally between the side walls 25c and 25d. An actuating rod 15 is journalled in bores in each of the end walls 25a and 25b and it may slide axially therein. An end 16 of the rod is flattened and widened so that it cannot move outwardly through the accommodating bore for the rod. The opposite end is provided with a plastic sleeve 14 having an eyelet 13 which is snap-fastened to the suspension wire 12.

In accordance with a feature of the invention, the switching member 20 is provided with a hollow bore to accommodate the rod 15 and it includes radially extending slots 21 to permit a snug fit of the rod within the bore in frictional engagement. The natural elasticity of the switching member 20 provides a snug interengagement with the rod 15.

Switching member 20 is provided with an outstanding or upstanding extension or switch separating element 22 of insulating material which in the off position extends between the ends of the spring contacts 18 and 19 and separates them and prevents electrical connecting engagement. With the switching member 20 set in the position shown in FIG. 2, the deflection of the spring wire 12 will cause a downward shifting movement of the rod 15 and a shifting of the member 22 so that it moves out from between the spring contacts 18 and 19 and permits them to engage and complete the electrical circuit. When the seat is again unloaded, the suspension wire 12 rides upwardly again and positions the insulating member 22 between the ends of the springs to break the electric circuit. If the spring wire 12 returns to a higher position, the switching member 20 will engage the top wall 25a and it will be shifted along the rod 15 without having any damage occur. Rod 15 will only be drawn up out of the housing when frictional engagement between it and the associated switching member 20 is overcome. This will merely change the rest position but it will not change the operation of the switch.

When seat suspension 11 is deflected downwardly by a load, the wire 12 displaces actuating rod 15 downwardly. Switching member 20 is also moved downwardly until it moves out of separating position between spring elements 18 and 19 and permits them to move together to effect actuation of the electrical circuit. An extension 23 of switching member 20 engages in a recess 24 which is defined along the length of the bottom wall or inner wall 25e. This prevents switching member 20 from twisting on the actuating rod 15 during any adjustment of movement thereof.

After moving over the operating path of switching member 20, actuating rod 15 can be displaced further downwardly. At the same time, the frictional engagement between the switching member 20 and the actuating rod 15 is released by the overcoming of the frictional contact therebetween. The deflecting movement of the actuating rod 15 can therefore be much greater than the operating movement of the switching member 20 without the switch becoming damaged in any respect.

If the seat is again relieved of load, the actuating rod 15 will continue to drive the switch member 20 upwardly until it assumes the inoperative position shown in FIGS. 1 and 2. The actuating rod 15 is then retracted further again upon release of the frictional engagement between the switching member 20 and actuating rod 15 if an over-ride occurs. Thus, in the embodiment of the switch shown, the switching positions of the switching member 20 are not positively and firmly associated with the end positions of the actuating rod 15. In addition, automatic adjustment of the switch positions is obtained by release of the frictional engagement between switching member 20 and actuating rod 15. In order to reset the switch, it is only necessary for the actuating rod 15 to be adjusted in respect to the switching member 20 only to the extent that it effects at least the operating movement of switching member 20 when the seat is loaded. The electrical switch is therefore not damaged if the displacement of the actuating rod 15 is much greater than expected. The frictional engagement between switching member 20 and actuating rod 15 provides a coupling which cancels the connection between the two parts when the switching member 20 has reached its end position but actuating rod 15 continues to be displaced.

While a specific embodiment of the invention has been shown and described in detail to illustrate the application of the principles of the invention, it will be understood that the invention may be embodied otherwise without departing from such principles.

What is claimed is:

1. A switch, particularly a load responsive switch for indicating automobile seat loading, comprising a pair of first and second contact springs, means mounting said first and second contact springs so that their ends are biased together in electrical contacting engagement, a movable actuating rod having one end with means for connecting it to the seat which is to bear the load, and a switching member having a portion of non-conductive material carried by said actuating rod and movable therewith through a path to come between said first and second contact springs to separate them and to break the electrical connection therebetween, a housing having end walls with bores through which said actuating rod extends and which provide means for guiding said actuating rod for axial movement, said switching member having a sleeve portion with a bore through which said rod extends and being frictionally engaged with said rod so as to be displaceable therealong, said portion of non-conductive material comprising an upstanding switch contact separating member which is movable between said spring contacts.

2. A switch, according to claim 1, including a guide defined along said housing, said switching member having a portion extending into said guide and being held by said guide during its movement against rotation in respect to said rod.

3. A switch, according to claim 1, wherein said means for connecting said rod to the seat comprises a fitting on the one end of said rod having a resilient partial eyelet which opens outwardly at its end whereby said eyelet may be engaged over a wire or rod element, the opposite end of said rod being flattened, and including a housing having a bore at each end for guiding said rod therethrough being of a size equal to the diameter of said rod and smaller than the flattened end so that it will not pass therethrough.

* * * * *